United States Patent [19]
Wolff

[11] 3,828,252
[45] Aug. 6, 1974

[54] METER WITH AUDIBLE READ-OUT

[75] Inventor: Heinz Wolff, London, England

[73] Assignee: W. Winter Limited, Edmunds, Suffolk, England

[22] Filed: Nov. 28, 1972

[21] Appl. No.: 309,953

[30] Foreign Application Priority Data
Nov. 29, 1971  Great Britain.................... 55229/71

[52] U.S. Cl. .............................. 324/99 D, 324/157
[51] Int. Cl. ....................... G01r 17/06, G01r 13/00
[58] Field of Search ........... 324/99 D, 157; 340/266

[56] References Cited
UNITED STATES PATENTS
3,081,431    3/1963    Werner et al...................... 324/99 D
3,163,819   12/1964    Calhoun............................ 324/99 D
3,727,214    4/1973    Wayne.............................. 324/99 D Primary Examiner—Alfred E. Smith
Attorney, Agent, or Firm—Donald D. Jeffery

[57] ABSTRACT

A meter with means for audible read-out including a plurality of words to be audibly read out, these words being recorded on a magnetic medium, and electronic means to select the appropriate words, and to synchronize the read-out.

5 Claims, 4 Drawing Figures

METER WITH AUDIBLE READ-OUT

BACKGROUND

There are many instances where a meter, such as a digital voltmeter, could be much more useful if provided with an audible read-out, either in place of, or in addition to, a visual display. For example, a blind person could use such a meter, or, in the case of a machine-tool, the operator could be given an indication of the position of the tool without having to avert his eyes from the job. Meters, such as weighing machines, have been provided with audible read-out, but these have used bulky, mechanical linkages. The present invention provides a compact, electronic system for selecting the recordings to be read out.

This invention relates to meters with audible read-out. Some machines such as weighing machines have included an audible read-out facility using a pre-recording of the numerical information to be read out. However, prior systems have not normally been capable of being adapted for use in other types of meter since the part of the recording to be read out has been brought into play by complex and bulky mechanisms.

There are many advantages to be gained from using audible read-out means in conjunction with known meters, such as digital voltmeters or ammeters or in fact any known meter in which a voltage is or could be generated proportional to the reading of the meter. One advantage is that such a meter would be capable of being used by a blind person. Many blind people are at present limited to their choice of occupation simply because they cannot see. The present invention would help to reduce the limitation.

In other cases, audible read-out means would enable one to note the reading of a meter while continuing to look elsewhere.

According to the present invention, there is provided in a meter or like instrument means for audible read-out including a plurality of recordings to be audibly read out, non-mechanical selection means for selecting the particular recording or recordings to be read out, and a loud speaker or earphone or the like.

In one embodiment of the invention, the recordings are recorded on a magnetic tape, disc or optical film which in use, is drawn past a reading head, and the non-mechanical selection means is electronic.

A preferred embodiment of the invention will now be described with reference to the accompanying drawings, in which.

The embodiment of the invention described below employs a magnetic tape to store the recorded speech material, but strictly analogous considerations apply to embodiments using magnetic discs or drums.

Figure 1:
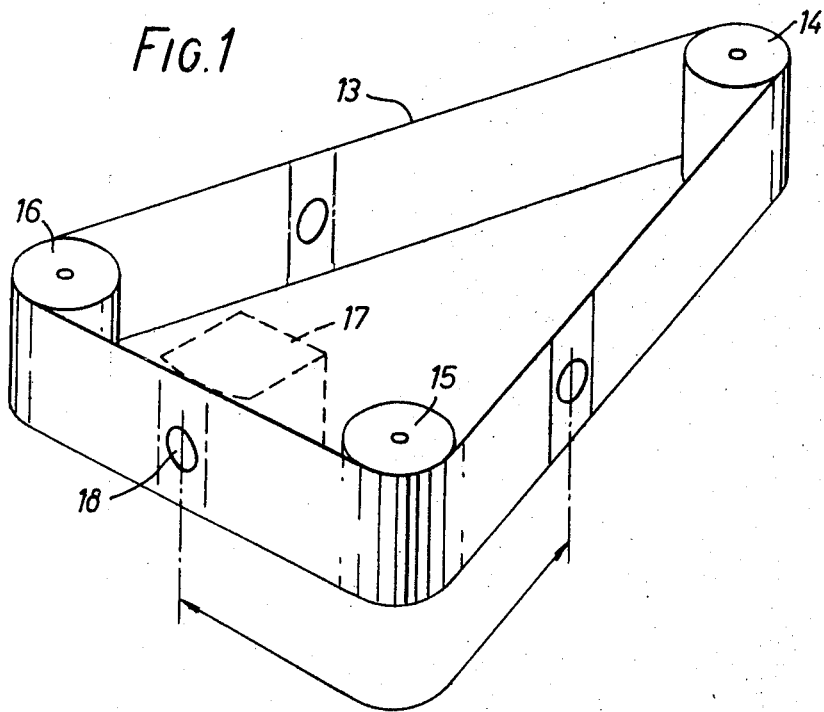
FIGS. 1 and 2 show a pictorial and a top plan, respectively, of a magnetic tape carrying assembly.
Figure 2:
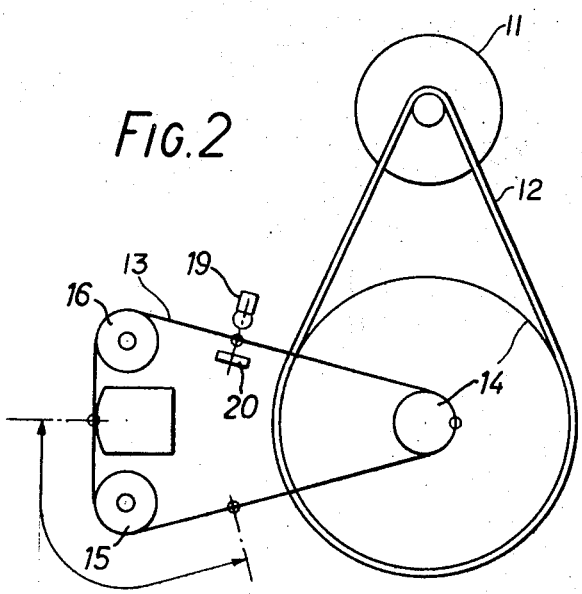

Referring to FIGS. 1 and 2, the magnetic tape 13, carrying the recorded speech is made into an endless loop. The endless tape loop is arranged in an approximately triangular configuration by reeving it around three pulleys, one of which 14, drives the tape, while the other two 15, 16 are idler pulleys. Tape drive pulley 14 is driven by means of motor 11 and flexible drive belt 12, as can be seen in FIG. 2; Between the two idler pulleys is interposed a twelve track head 17 which can read off information stored on the tape. In order to avoid having an inconveniently short loop, each word is recorded more than once, for example three times. Accordingly, the endless tape is made up in this exemplary embodiment from three separate sections, each section beginning with a hole and storing a complete set of words. A complete set of words comprises the ten decimal digits, 0 - 9, and the word 'point'. The endless tape may include a spare track. Each of the three tape sections therefore has twelve parallel tracks to store these eleven words, one to a track, and a spare as mentioned. The three tape sections are spliced together, and at each joint, a hole 18 is punched in the centre of the tape. A lamp 19 and a phototransistor 20 (or equivalent photo-sensitive device) are placed on opposite sides of the tape 13 so that the phototransistor can 'see' the lamp when the lamp, hole, and phototransistor are in line. The phototransistor forms part of a monostable triggering circuit 21 which sends a pulse to the logic circuits each time a hole passes between the lamp and the phototransistor, which is equivalent to saying whenever a new set of words is about to be read by the tape head. The logic circuits ensure that the spoken read-out will not start in the middle of a word.

Figure 3A:
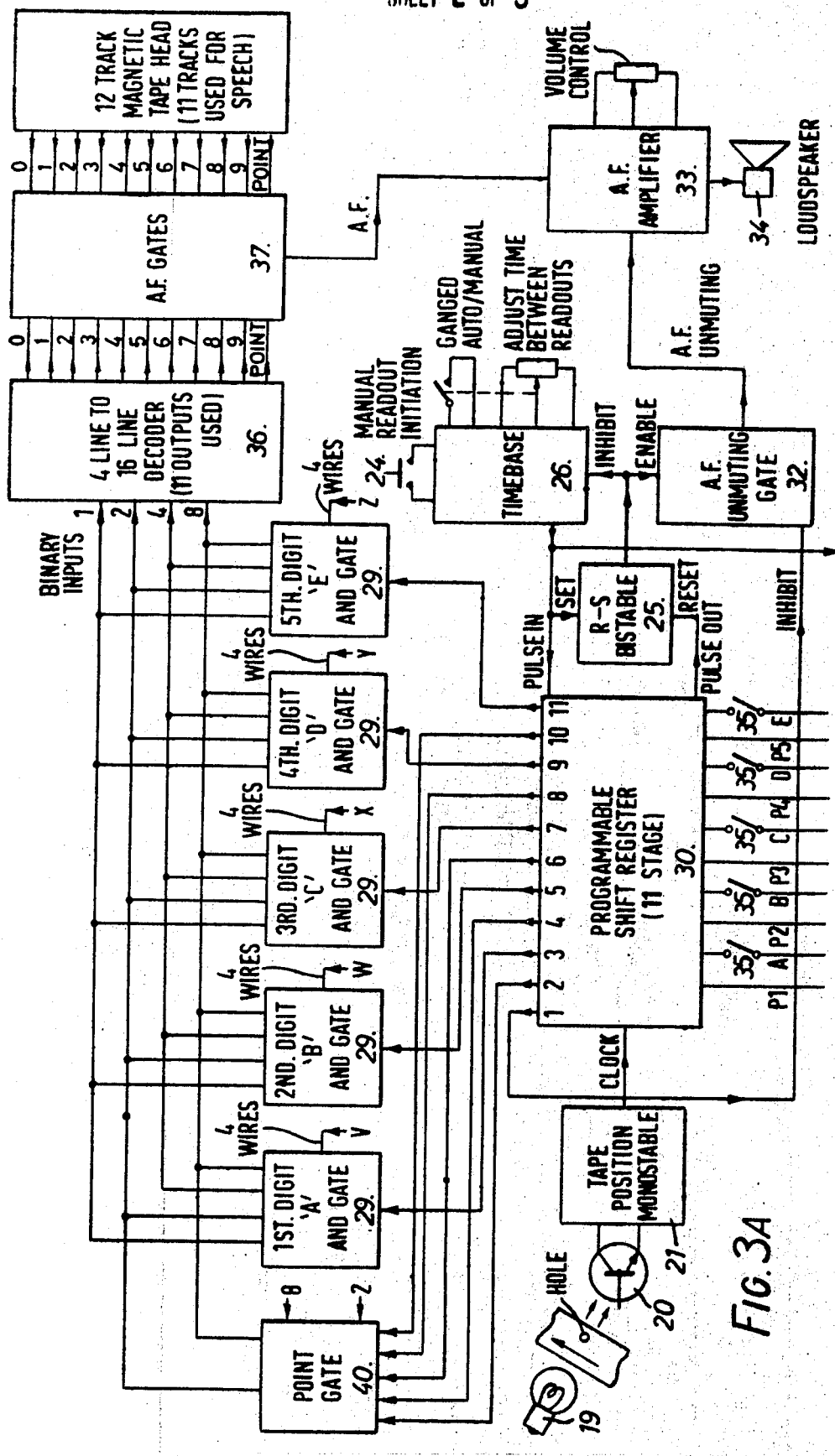
FIGS. 3A-3B show electronic circuitry used in the meter, in block diagram form.
Figure 3B:
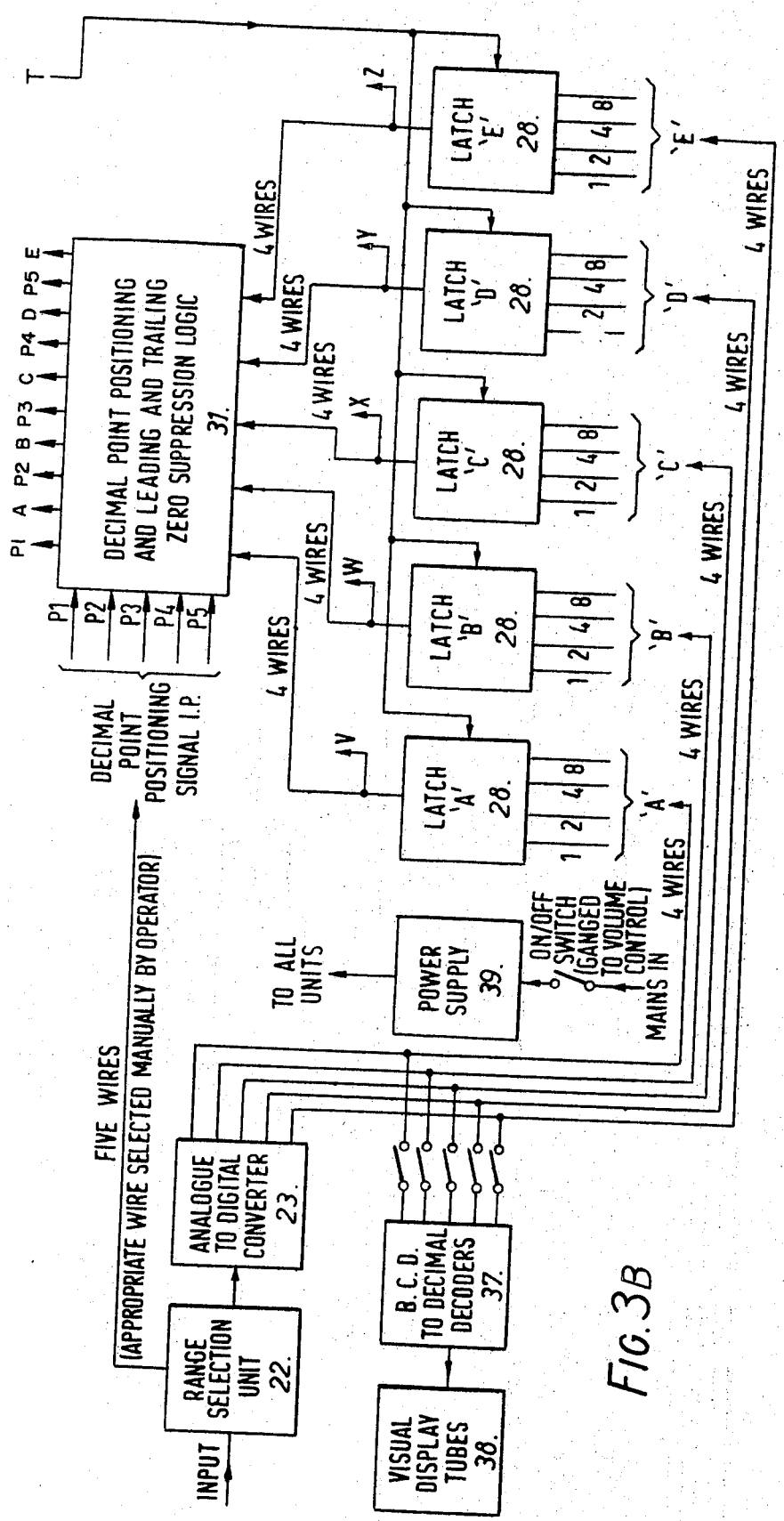

In FIG. 3B the quantity to be measured by the meter is applied to the input of range selection unit 22 in the form of an electrical voltage signal. The range selection unit comprises essentially a resistive voltage divider, well known in the art, which is adjustable so as to provide a full-scale output signal range of 0-5 volts, and which has an output linearly proportional to the input signal. This output is applied to an analogue to digital converter 23 of the ramp-comparison type. In a ramp-comparison analogue to digital converter, the signal to be measured is compared with a standard signal which increases linearly from zero to a predetermined maximum, falls to zero, and then repeats its sweep. The time taken for the standard signal to reach equality with the input voltage is proportional to the magnitude of the input voltage. During the time in which the standard signal is increasing from zero to the level of the input signal, a clock circuit, not shown separately, which could for example be an astable multivibrator or a crystal-controlled oscillator, supplies pulses which are counted by a train of bistable circuits. In this embodiment of the invention the bistables are arranged to count to a scale of ten and their output is in the form of 8421 Binary Coded Decimal, though other binary codes could be used. The number of decades required in the counting circuit is equal to the number of digits required to be read out. The present embodiment caters for five digits read-out but a larger or smaller number could be used if desired. The five digits are designated A, B, C, D and E. The number of digits read out, and the number of words provided, are not related.

When numerical value of the voltage to be measured has been stored digitally in the counters, it is necessary for the appropriate recorded words to be selected. The instrument can be made to give audible read-outs at defined intervals automatically, or a single read-out can be given by an electrical command when the operator presses a manual read-out initiation control 24. When this manual read-out initiation is actuated a pulse is given out by a time base 26, this pulse having the following functions:

Firstly, it sets an R-S (reset and set) bistable circuit 25 to prevent the time base sending further pulses. Secondly it is routed via the path marked T to five input latches 28, each of which has at its input, one of the five digits to be read out, coded in binary coded decimal. Each digit requires four wires because binary coded decimal is a four bit code. The pulse from the time base, when it arrives at the latches, causes the information present at the latch inputs to be transferred to the latch outputs. From here the information is available to the five digit 'AND' gates 29 via the paths marked V, W, X, Y and Z (the wires have been omitted for the sake of clarity). The information will not be allowed through the AND gates until it is also applied to the second of the AND gates' inputs, but the information reaching these second AND gates' inputs is processed by the logic circuits 30 which is a programmable shift register and 31 which is a decimal point positioning and leading and trailing zero suppression logic. The operation of these circuits will be described shortly.

The third function of the pulse from the time base is performed when it enters the programmable shift register 30. As has already been mentioned, the read-out must not commence until the tape track head is at the beginning of a set of words. The programmable shift register has a first state 1 in which it remains until the time base pulse is clocked by a pulse from the circuit, already mentioned, which senses the tape position. While the programmable shift register is in this first state it sends an inhibiting signal to a gate 32 controlling an audio-frequency amplifier 33 driving a loudspeaker 34. The audible read-out is thus muted until the tape is in the correct position.

In a five digit number, there are six possible positions for the decimal point, but the last of these is redundant, as no decimal point is needed at the end of the number. The required point position is manually selected from among the five possible positions when the range selector unit is set. There are five point inputs P1-5, and the selected one is connected to a logic high level, while the others are connected to a logic low level and are rejected by logic block 31. Suppose, for example, that a logic high has been applied to input P5 at the beginning of the readout. This signal is applied to one input of an AND gate within logic block 31. The other input of the same AND gate will be at a logic high level provided E digit has not been suppressed, i.e., provided there is a digit following the point. A logic high level will therefore be present at the output of the AND gate, resulting in a logic high at output P5 of logic block 31. The decimal point positioning and leading and trailing zero suppression logic circuiting also rejects redundant zeros in a number. If any number begins with a zero on the left hand side of a decimal point, or ends with a zero on the right hand side of a decimal point, those zeros are redundant. For example, in the number 03.010, both the first and last zero are redundant. The decimal point in this number is in the P3 position.

The programmable shift register is a memory circuit consisting of ten bistable flip-flops (not shown). These flip-flops store the digital and point information applied to their respective inputs from the decimal point and leading and trailing zero suppression logic circuiting. The shift register has ten read-out states labelled 2-11 corresponding to the five digits of the number to be read out, and the five possible point positions. Clock pulses are supplied to the shift register to cause it to change sequentially from one read-out state to the next. When the shift register is thus stepped from the first read-out state 2 to the second read-out state 3, the information corresponding to the first state, in this case, the word 'point', will be fed out to a point gate 40. Similarly, when the shift register is stepped by the clock pulse from the second to the third read-out states, the first digit A of the number to be read out will be supplied to the first AND gate 29. In this way the shift register progresses sequentially through its ten read-out states 2-11, so that the whole of the number is supplied in sequence to the AND gates. The shift register is programmed by manually operable switches 35 and by manually selectable signals P1-5. Read-out states corresponding to unused point positions, or to digits rejected by opening the switches 35, are passed by without supplying the information to the AND gates. The pulses needed to make the shift register change state are supplied by photo-transistor 20 through monostable triggering circuit 21, except for the pulse initiating the process, which, as has been said, is supplied by the time base.

When the information has been supplied to the second of the AND gate inputs, it is allowed to pass through the gates to the decoder 36, which converts the binary coded decimal into decimal. This decimal information can then be supplied to the A.F. gates 37, which select the appropriate recording from the tape and supply it, through the audio-frequency amplifier to the loudspeaker. Access to the word 'point' is obtained by decoding the tenth line permanently set on the point gate input.

When it has completed all its read-out states, the shift register supplies a pulse to reset the R-S bistable, thus enabling the time base to initiate another reading. While the manual method of operation has been described, the time base could be set by a switch to give pulses at regular intervals determined by the time control.

If a conventional visual read-out were required, the output from the analogue to digital converter could be applied straight to decoders 37 and thence to visual display tubes 38.

The unit could be powered from 110/220/250 volts, 50-60 C/S mains supply or have either dry batteries or re-chargeable batteries. The power supply is generally indicated at 39.

While the above apparatus has been described as if used in conjunction with a digital voltmeter, it is obvious that audible read-out means could be used in conjunction with other apparatus without departing from the scope of the invention. For example, a number of centre lathes are at present fitted with a digital visual read-out showing the position of the tool. This could be converted into audible read-out according to the invention, thus enabling the operator to use this information without taking his eyes off the machine.

Another advantageous application of the invention is to an electrical measuring instrument. The user, for example when checking a circuit using probes, can then keep his eyes on the positioning of the probes and note the audible measurement information provided by the machine.

Many other applications of the invention are possible, being obvious to one skilled in the art.

I claim:

1. A meter with means for audible read-out comprising:
   a. a range selection unit responsive to an input signal and operative to provide a standardized output first signal, and a second signal to decimal point positioning logic circuitry;
   b. a series of latch circuits, each fed with digital information representative of one digit to be read out, and each latch circuit including a gate which allows the digital information to pass through when a control pulse arrives at the latch;
   c. a decimal point positioning logic circuit fed with said second signal from the range selection unit and connected to said latches to process the digital information therefrom;
   d. a programmable shift register connected to the decimal point positioning logic circuit to receive the processed digital information therefrom;
   e. a series of gate circuits connected to the programmable shift register;
   f. a decoder circuit connected to the outputs of said gates to convert Binary Coded Decimal information into decimal;
   g. a series of audio-frequency (A.F.) gates connected to said decoder circuit and also to a magnetic pick-up head to select recordings recorded on a magnetic medium;
   h. an A.F. amplifier stage connected to said A.F. gates to drive a loudspeaker;
   i. a photo-electric device connected into a monostable circuit to sense the position of the magnetic medium and operative to produce a pulse which is fed to the programmable shift register to indicate that the magnetic medium is in a 'ready to read out' position.

2. A meter according to claim 1, further comprising:- a read-out initiation switch connected to a time base, this time base being constructed to emit pulses on initiation; an A.F. unmuting gate circuit connected to the time base to receive one such pulse; and a reset and set bistable circuit also connected to the time base to receive another such pulse and further connected to the programmable shift register.

3. A meter according to claim 1, further including an analogue to digital converter connected to the range selection unit and operative to provide digital information corresponding to the standard output signal from the range selection unit, wherein the analogue to digital converter includes means for generating a first signal which increases linearly from zero to a maximum, this first signal being compared with the signal to be measured and the time interval during which the said first signal rises from zero to equality with the signal to be measured; a circuit for generating pulses during said time interval and means for counting these pulses.

4. A meter as claimed in claim 1, in which the recording consist of a plurality of words, each word being recorded on a separate track of a magnetic recording medium.

5. A meter as claimed in claim 4, in which synchronization of the read-out is accomplished with the aid of an index pulse also recorded on the magnetic medium.

* * * * *

UNITED STATES PATENT AND TRADEMARK OFFICE
CERTIFICATE OF CORRECTION

PATENT NO. : 3,828,252
DATED : August 6, 1974
INVENTOR(S) : HEINZ WOLFF

It is certified that error appears in the above-identified patent and that said Letters Patent are hereby corrected as shown below:

On the first page, item [73]

the assignee's name and address should be corrected to read as follows:

"W. Vinten Limited
Western Way
Bury St. Edmunds
Suffolk, England"

Signed and Sealed this

Seventeenth Day of August 1976

[SEAL]

Attest:

RUTH C. MASON
Attesting Officer

C. MARSHALL DANN
Commissioner of Patents and Trademarks